United States Patent [19]
Broos et al.

[11] Patent Number: 5,122,548
[45] Date of Patent: Jun. 16, 1992

[54] ELASTOMERIC POLYISOCYANATE-BASED POLYMERS FROM POLYOXYALKYLENE POLYOLS CONTAINING INTERNAL POLYOXYETHYLENE BLOCKS

[75] Inventors: Rene Broos, Bornem, Belgium; Johan A. Thoen; Richard J. Elwell, both of Terneuzen, Netherlands

[73] Assignee: The Dow Chemical Company, Midland, Mich.

[21] Appl. No.: 497,945

[22] Filed: Mar. 23, 1990

[51] Int. Cl.$^5$ .............................................. C08G 18/48
[52] U.S. Cl. .................................. 521/163; 521/174; 521/176; 521/914; 528/76; 528/77; 252/182.27; 568/620
[58] Field of Search ................... 252/182.27; 521/163, 521/174, 176, 914; 528/76, 77; 568/620

[56] References Cited

U.S. PATENT DOCUMENTS

| | | | |
|---|---|---|---|
| 3,821,130 | 6/1974 | Barron et al. | 521/133 |
| 4,125,505 | 11/1978 | Critchfield et al. | 524/377 |
| 4,243,760 | 1/1981 | McDaniel et al. | 521/176 |
| 4,575,518 | 3/1986 | Rasshofer et al. | 521/914 |
| 4,745,170 | 5/1988 | Bushman et al. | 528/61 |

*Primary Examiner*—Maurice J. Welsh
*Assistant Examiner*—Rachel Johnson

[57] ABSTRACT

This invention relates to elastomeric polyisocyanate-based polymers, particularly polyurethane elastomeric polymers, prepared from polyol compositions comprising a polyoxyalkylene polyol having a hydroxyl equivalent weight of from about 800 to about 3000 and containing from 10 to 40 weight percent polymerized ethylene oxide wherein the ethylene oxide is distributed as a plurality of internal polyoxyethylene blocks having a molecular weight of from about 176 to about 600, and a polyoxyethylene cap use of such polyols. Polyols provides for polymers exhibiting desirable physical properties including good abrasion wear resistance.

11 Claims, No Drawings

5,122,548

ELASTOMERIC POLYISOCYANATE-BASED POLYMERS FROM POLYOXYALKYLENE POLYOLS CONTAINING INTERNAL POLYOXYETHYLENE BLOCKS

BACKGROUND OF THE INVENTION

This invention relates to elastomeric polyisocyanate-based polymers, particularly polyurethane and/or polyurea polymers prepared from polyoxyalkylene polyols containing internal polyoxyethylene blocks.

It is well-known to prepare polyurethane polymers by reacting an organic polyisocyanate with an isocyanate-reactive composition comprising a polyether polyol or a polyester polyol. Advantageously, when preparing elastomeric polyurethanes it is also known to incorporate a chain-extending agent into the isocyanate-reactive composition.

When preparing elastomeric polyurethanes from polyester polyols, the resulting polymers have good physical properties, but may only be prepared under difficult, undesirable process conditions. Polyester polyols are frequently highly viscous liquids or low melting point solids at room temperature. It is therefore necessary to conduct such processes employing polyester polyols at an elevated temperature or employ specialized equipment capable of handling high viscosity components.

An alternative to using polyester polyols is to use polyether polyols in the preparation of elastomeric polyurethane polymers. U.S. Pat. No. 4,440,705 discloses the use of polyether polyols in the preparation of polyurethane elastomers. The polyether polyols described are polyoxypropylene polyols end-capped with polyoxyethylene blocks. The polyoxyethylene blocks are present in such concentrations to provide sufficient primary hydroxyl content allowing for high reactivity and short mold cycle times.

However, to obtain elastomeric products which have similar properties to those prepared from polyester polyols, especially with respect to resistance to abrasive wear, it has been necessary to employ polyether polyols exhibiting strong cohesive interactions such as, for example, polytetramethylene glycol.

Alternatively, it is possible to enhance the cohesive interactions by extending the polyoxyethylene end-cap of the polyol. However, in this case undesirable polar interactions may be encouraged leading to turbidity of the polyether polyol. The presence of turbidity is disadvantageous as it can cause processing difficulties in preparing the elastomer and provide an elastomer with inferior physical properties. Such polyether polyols, as polyester polyols, can require high processing temperatures as turbidity frequently is associated with higher viscosities.

In Canadian Patent 1,133,650 it is taught to prepare copolymer polyols from ethylene oxide and propylene oxide where the ethylene oxide is distributed internally within the oxyalkylene chain and as a terminal oxyethylene cap. The internal ethylene oxide is taught as providing for solubility of the chain-extending agent and the terminal oxyethylene cap provides for required processability characteristics and physical properties of the resulting elastomeric polymer.

In the published patent specification, GB 1,063,278 it is taught to prepare elastomeric polyurethanes from polyether polyols having a hydroxyl equivalent weight of from 3400 to 8000 and containing butylene oxide and from 10 to 50 weight percent ethylene oxide distributed randomly. The resulting elastomers are disclosed as having enhanced abrasion resistance, low hardness and low temperature properties compared to elastomers prepared from lower equivalent weight polyether polyols.

However, the incorporating of ethylene oxide into a polyether polyol for use in elastomeric polymer preparation has some disadvantages. The ethylene oxide content provides a more polar polyol which has a greater hygroscopic tendency and therefore the corresponding elastomeric polymers display similar characteristics. Such polymers are susceptible to hydrolysis and are therefore unsuitable for applications where prolonged exposure to humid conditions may occur.

It is therefore desirable to prepare an elastomeric polyurethane polymer from a polyether polyol that provides for optimum abrasion resistance properties and yet which is a clear, low viscosity liquid allowing for good processability at, for example, room temperature. It is further desirable that such a polyether polyol provides for similar or improved physical properties as for existing polymers.

SUMMARY OF THE INVENTION

We have now discovered that elastomeric polyisocyanate-based polymers having satisfactory humid aging characteristics and improved abrasion resistance properties can be prepared using polyoxyalkylene polyols which are clear, low viscosity liquids, conferring good processability at room temperature. Such polyoxyalkylene polyols are characterized in that they have an average hydroxyl equivalent weight of from about 800 to about 3000 and contain a plurality of internal polyoxyethylene blocks of specific molecular weight in addition to a terminal polyoxyethylene cap.

In one aspect, this invention is an elastomeric polyisocyanate-based polymer prepared by contacting under reaction conditions a mixture comprising (a) an organic polyisocyanate: and (b) an isocyanate-reactive composition comprising at least one polyoxyalkylene polyol having a hydroxyl equivalent weight of from about 800 to about 3000 and containing polymerized ethylene oxide in from about 10 to about 40 weight percent by total weight of the polyoxyalkylene polyol wherein (i) the polyol contains at least two internal polyoxyethylene blocks having a molecular weight of from about 176 to about 600; and (ii) the polyol is capped with polymerized ethylene oxide in from about 5 to about 25 weight percent by total weight of the polyol, and characterized in that the ratio of (a) to (b) is such so as to provide an average of from 0.9 to 1.25 isocyanate groups per active hydrogen atom present in the isocyanate-reactive composition.

In a second aspect, this invention is a polyoxyalkylene polyol having a hydroxyl equivalent weight of from about 800 to about 3000 and comprising polymerized ethylene oxide in from about 10 to about 40 weight percent by total weight of the polyoxyalkylene polyol and characterized in that (i) the polyol contains at least two internal polyoxyethylene blocks having a molecular weight of from about 176 to about 600: and (ii) in that the polyol is capped with polymerized ethylene oxide in from about 5 to about 25 weight percent by total weight of the polyol.

In a third aspect, this invention is an isocyanate reactive composition suitable for use in preparing an elastomeric polyisocyanate-based polymer characterized in that it comprises (a) at least one polyoxyalkylene polyol having a hydroxyl equivalent weight of from about 800 to about 3000 and containing polymerized ethylene oxide in from about 10 to about 40 weight percent by total weight of the polyoxyalkylene polyol wherein (i) the polyol contains at least two internal polyoxyethylene blocks having a molecular weight of from about 176 to about 600, and wherein (ii) the polyol is capped with polymerized ethylene oxide in from about 5 to about 25 weight percent by total weight of the polyol: and (b) from about 2 to about 50 parts by weight per 100 parts by total weight of all polyol present of a difunctional chain-extending agent.

In a fourth aspect, this invention relates to the use of a polyoxyalkylene polyol having a hydroxyl equivalent weight of from about 800 to about 3000 and containing polymerized ethylene oxide in from about 10 to about 40 weight percent by total weight of the polyoxyalkylene polyol and wherein (a) the polyol contains at least two internal polyoxyethylene blocks each having a molecular weight of from about 176 to about 600, and wherein (b) the polyol is capped with polymerized ethylene oxide in from about 5 to about 25 weight percent by total weight of the polyol, in reaction with an organic polyisocyanate to prepare an elastomer polyisocyanate-based polymer characterized in that the resulting polymer has imparted to it improved abrasion resistance properties.

In a fifth aspect, this invention relates to a process for preparing an elastomeric polyisocyanate-based polymer having an average density of from about 200 to about 700 kg/m$^3$, the improvement comprising employing a polymer-forming composition comprising (A) a polyoxyalkylene polyol having a hydroxyl equivalent weight of from about 800 to about 3000 and containing polymerized ethylene oxide in from about 10 to about 40 weight percent by total weight of the polyol wherein (i) the polyol contains at least two internal polyoxyethylene blocks having a molecular weight of from about 176 to about 600, and (ii) the polyol is capped with polymerized ethylene oxide in from about 5 to about 25 weight percent by total weight of the polyol, (B) a chain-extending agent having a molecular weight of about 250 or less, (C) an isocyanate-terminated 4,4'-methylenediphenylisocyanate prepolymer, in an amount to provide the composition with from about 0.9 to about 1.25 isocyanate groups per active hydrogen-containing group, and (D) an effective amount of a blowing agent wherein (B) is present in from about 2 to about 40 parts by weight per 100 parts of total weight of all polyol including (A).

Surprisingly it has been found that by distributing the ethylene oxide within the polyol as described above, it allows for the formation of polyoxyalkylene polyols which are clear low viscosity products. Further, it is shown that, surprisingly, the use of such polyoxyalkylene polyols in preparing elastomeric polymers provides for good abrasion resistance properties normally only attainable by use of polyols having greater equivalent weight. The improved abrasion resistance properties are thought to result from the enhanced cohesive interactions within the polymeric structure obtained through the incorporating of such internal polyoxyethylene blocks into the polyether polyol.

DETAILED DESCRIPTION OF THE INVENTION

As mentioned, this invention relates to an elastomeric polyisocyanate-based polymer having satisfactory humid aging characteristics and improved abrasion resistance properties. The polymer can be characterized in that it exhibits abrasion resistance properties as measured according to test procedure DIN 53516 where the observed weight loss is from about 325 mg or less, preferably from about 300 mg or less, more preferably from about 250 mg or less and most preferably from about 200 mg or less.

The elastomeric polyisocyanate-based polymer of this invention is prepared by contacting under reaction conditions a mixture comprising an organic polyisocyanate and an isocyanate-reactive composition. The isocyanate-reactive composition comprises at least one polyoxyalkylene polyol having a plurality of internal polyoxyethylene blocks and being end-capped with polymerized ethylene oxide.

The polyoxyalkylene polyol is characterized in that it has an average hydroxyl equivalent weight of from about 800 to about 3000, preferably from about 1000 to about 2500, and more preferably from about 1500 to about 2300. The polyol, containing an initiator residue and an oxyalkylene chain residue, is further characterized in that it contains from about 10 to about 40, preferably from about 15 to about 40, and more preferably from about 20 to about 40 weight percent by total weight of the polyol, polymerized ethylene oxide.

To achieve the desirable physical properties of elastomeric products prepared from the polyoxyalkylene polyol, it has been discovered that it is necessary to have the polymerized ethylene oxide distributed in a specific manner. The polymerized ethylene oxide content should be distributed within the polyol as an internal polyoxyethylene block and as a terminal, or cap, polyoxyethylene block. Preferably, the polyol contains at least two internal polyoxyethylene blocks.

Advantageously, the molecular weight of each internal polyoxyethylene block is from about 176 to about 600, preferably from about 220 to about 528, and more preferably from about 308 to about 440. If the molecular weight of the internal block is less than or greater than this range, the improved abrasion resistance or maintenance of physical properties may not be obtained. Further, if the molecular weight of the block exceeds 600, depending on the end equivalent weight of the polyol and total ethylene oxide content, the resulting polyol may be turbid.

The quantity of polymerized ethylene oxide present as an end-cap on the polyol is from about 5 to about 25, preferably from about 15 to about 25, and more preferably from about 18 to about 22 weight percent by total weight of the polyol. The end-cap is necessary to provide the polyol with sufficient primary hydroxyl character allowing for a satisfactory balance between polyol reactivity and visco-elastic properties when preparing the polymer. As with the internal polyoxyethylene block, if the size of the polymerized ethylene oxide end-cap becomes too great for a given polyol equivalent weight, the product may become turbid and/or solid.

If distribution of polymerized ethylene oxid within the polyol is different or of different proportions to that described, then the desired results and improvements may not be obtained in the resulting polymer.

The internal polyoxyethylene block is separated from other like internal blocks and/or the terminal polyoxyethylene block by a bridging polyoxyalkylene block consisting essentially of $C_3$ or higher oxyalkylene units. Exemplary of such $C_3$ or higher oxyalkylene units is propylene oxide, 1,2-butylene oxide, 2,3-butylene oxide, epichlorohydrin, trichlorobutylene oxide and mixtures thereof. Preferably, the bridging polyoxyalkylene block consists essentially of polymerized propylene oxide.

The initiator residue contained within the polyol is that from an initiator or mixture of initiators containing an average of at least 1.7, preferably from about 1.8 to about 4, more preferably from about 1.8 to about 3 and most preferably about 1.8 to about 2.2 active hydrogen atoms per molecule.

For the purpose of this invention, active hydrogen atoms are defined as those hydrogens which react positively in the Zerewitinoff test, see Kohler, *J. Amer. Chem. Soc.*, Vol. 49, p. 3181 (1927).

Representative of groups containing such active hydrogen atoms are -OH, -COOH, -SH and -NHR where R can be hydrogen, alkyl, cycloalkyl, aryl aromatic and so forth.

Exemplary of suitable initiators bearing such active hydrogen atoms are polyols, polyether adducts of polyols, polyamines and other compounds having a plurality of active hydrogen atoms per molecule, such as are described in column 2 of U.S. Pat. No. 4,500,422 and incorporated herein by reference.

Preferred initiators for use in preparing the polyoxyalkylene polyol employed within this invention are ethylene glycol, propylene glycol, butylene glycol, glycerine, 1,1,1-trimethylolpropane, 1,1,1-trimethylolethane, $\alpha$-methylglucoside, $C_{2-8}$ alkylene diamines such as, for example, ethylenediamine and hexamethylenediamine, and mixtures thereof. Especially preferred are the glycol initiators or alkoxylated adducts of such glycols.

Suitable processes for the preparation of the polyoxyalkylene polyols are such as, for example, disclosed by Wurtz in 1859 (see *Encyclopedia of Chemical Technology*, Vol. 7, pp. 257–262, published by Interscience Publishers, Inc. (1951)) or U.S. Pat. Nos. 1,922,459 and 3,040,076. Generally, the alkylene oxide(s) is polymerized at pressures above atmospheric pressure with an initiator in the presence of a strongly basic material such as an alkali metal hydroxide or tertiary amine acting as an alkoxylation catalyst. Suitable catalysts include potassium hydroxide, sodium hydroxide and barium hydroxide with barium hydroxide being preferred because it allows for the convenient manufacture of high equivalent weight products with low levels of unsaturation, generally less than 0.075 meq/g. The use of polyether polyols having low unsaturation levels in the preparation of the polyurethane elastomers is advantageous if products with overall desirable physical properties are to be obtained.

In addition to the polyoxyalkylene polyol, the isocyanate-reactive composition advantageously comprises a chain-extending agent. The term "chain-extending agent" as used herein represents an organic compound, generally a difunctional compound having a molecular weight of 250 or less and preferably 200 or less. Exemplary of suitable chain-extending agents are glycols, aliphatic diamines, aromatic diamines and mixtures thereof. Additional compounds suitable as chain-extending agents are described in columns 5 and 6 of U.S. Pat. No. 4,500,442. Preferred chain-extending agents include the glycols such as, for example, ethylene diol, 1,3-propylene diol, 1,6-hexane diol and especially 1,4-butane diol.

The amount of chain-extending agent present in the isocyanate-reactive composition depends on its molecular weight and the physical properties desired for the resulting polymer. Greater mole quantities of chain-extending agent generally provide for polymers which are harder and exhibit, for example, higher heat distortion temperatures. Typically, the chain-extending agent will be present in from about 2 to about 40, preferably from about 2 to about 30, and more preferably from about 5 to about 20 parts by weight per 100 parts of total weight of all polyols, including the polyoxyalkylene polyol, present.

Combinations of chain-extending agents, especially dihydroxyl compounds, may be used to enhance certain processing properties such as, for example, flowability of the reacting mixture when preparing molded articles.

Further to the polyoxyalkylene polyol and chain-extending agent present in the isocyanate-reactive composition, the composition optionally may contain additional polyol components characterized by the absence, within their structure, of internal blocks of polymerized ethylene oxide having a molecular weight of from 176 to 600.

Polyols suitable for use as the optional component when preparing elastomeric polymers are those typically having hydroxyl equivalent weights from about 800 to about 3000 and may be a polyester polyol but more preferably are a polyether polyol. Illustrative of such polyols are the polyether polyols sold by The Dow Chemical Company under the trademark "VORANOL TM " and include VORANOL TM EP 1900 and VORANOL TM CP 6001.

When the isocyanate-reactive composition comprises the polyoxyalkylene polyol in combination with an optional polyol, the polyoxyalkylene polyol is present in a quantity sufficient to obtain the improved abrasion resistance properties. Generally, such quantity is from about 50 to about 99, preferably from about 60 to about 99 and more preferably from about 60 to about 90 weight percent of the total weight of polyoxyalkylene polyol and optional polyol present. When using combinations of the polyoxyalkylene polyol and optional polyol, it is advantageous for the physical properties of the resulting elastomer if the total ethylene oxide content of such a mixture is from about 10 to about 40, preferably from about 20 to about 40 and more preferably from about 30 to about 40 weight percent.

To prepare the elastomeric polymer of this invention, the isocyanate-reactive composition is contacted and reacted with an organic polyisocyanate. Advantageously, such organic polyisocyanate has an average isocyanate functionality of from about 1.8 to about 2.7, and preferably from about 1.9 to about 2.4. Use of isocyanates having functionalities outside these limits may not provide an elastomeric polymer of quality. Suitable polyisocyanates include aliphatic and aromatic polyisocyanates. Such polyisooyanates are described, for example, in U.S. Pat. Nos. 3,001,973; 3,124,605; 3,152,162; 3,394,164; 3,401,180; 3,454,606; 3,492,330 and 4,065,410 which are incorporated herein by reference.

Aromatic polyisocyanates useful herein include 2,4- and/or 2,6-toluene diisocyanate, 2,4'- and 4,4'-diphenylmethane diisocyanate (MDI), p-phenylene diisocyanate, polymethylene polyphenyl polyisocyanates, or mixtures thereof. Also useful are polymeric derivatives of 4,4'-diphenylmethane diisocyanate as well as quasi-prepolymers.

Prepolymers and quasi-prepolymers of the above-mentioned polyisocyanates are useful herein. Such prepolymers will typically have an isocyanate content of from about 0.5 to about 48 percent, preferably from about 5 to about 25 percent and more preferably from about 15 to about 25 percent by weight isocyanate groups. The prepolymers can be prepared by processes well-known to those skilled in the art. Typically, the prepolymers are prepared by reacting a stoichiometric excess of the polyisocyanate with an active hydrogen-containing material. The active hydrogen-containing material can be of high or low molecular weight. Preferably, the prepolymer is prepared by reacting all or a portion of the active hydrogen-containing material with an excess of the polyisocyanate, and wherein preferably the active hydrogen-containing material contains from about 2 to about 3 isocyanate-reactive hydrogen atoms per molecule.

The preferred isocyanates for preparing the polymers of this invention are those comprising an aromatic polyisocyanate preferably an aromatic diisocyanate comprising 4,4'-diphenylmethane diisocyanate or derivatives thereof, especially prepolymers. Advantageously, the aromatic polyisocyanate comprises at least 50, and preferably at least 70 weight percent of 4,4'-diphenylmethane diisocyanate.

The quantity of polyisocyanate employed in the preparation of the elastomeric polymer is sufficient to react with all the isocyanate-reactive, active hydrogen atoms present in the isocyanate-reactive composition. Advantageously, there is sufficient polyisocyanate used to provide from about 0.9 to about 1.25, preferably from about 0.95 to about 1.15, and more preferably from about 0.97 to about 1.05 isocyanate groups per active hydrogen atom present in the isocyanate-reactive composition.

Additives such as catalysts, blowing agents, surfactants, fillers, pigments, antioxidants, and antistatic agents can also be present when preparing the polymer of this invention. The use of such additives is well-known in the art and reference is made thereto for this purpose.

Suitable catalysts include the tertiary amine and organometallic compounds such as described in U.S. Pat. No. 4,065,410. When making the polymers of this invention, it is preferred to use catalysts. Generally, from about 0.01 to about 2, preferably from about 0.01 to about 1.0 part of oatalyst is employed per 100 parts of isooyanate-reactive composition. Particularly useful catalysts are dibutyltin laurate, triethylenediamine and bis(dimethylaminoethyl)ether.

Blowing agents which are useful in preparing elastomeric polymers having a cellular structure or a reduced overall polymer density include water which reacts with isocyanate groups to generate carbon dioxide and volatile organic compounds. The blowing agents are employed in an amount to provide the elastomeric polymer having an overall density of typically from about 200 to about 700, preferably from about 250 to about 600 and more preferably from about 250 to about 550 $kg/m^3$. Such elastomeric polymers are of value in applications where the use of lower density materials is desirable such as, for example, shoe soles.

The amount of water which may be used depends on the desired density of the polymer but is advantageously from 0.05 to 2 weight percent based on the weight of polyol composition. Other suitable blowing agents are low boiling liquids, generally organic compounds, which evaporate under the influence of the reaction temperature. Such boiling agents generally have a boiling point below 100° C. and include halogenated hydrocarbons such as methylene chloride, trichlorofluoromethane, dichlorodifluoromethane, dichlorofluoromethane, dichlorotetrafluoroethane, 1,1,2-trichloro-1,2,2-trifluoroethane, 1,1,1-trichloroethane, 1,1,1-trichlorodifluoroethene, and 1,1,1-trichlorofluoroethane. Mixtures of these low boiling liquids with each other and/or with substituted or unsubstituted hydrocarbons may be used. Typically, such blowing agents are used in amounts from about 0.1 to about 10 weight percent based on the total weight of polyol composition, to provide polymers of the desired density.

Suitable pigments and fillers include carbon black, titanium dioxide, iron oxide, calcium carbonate, alum, clays such as kaolin or wollastonite, prepared glass fibers chopped or continuous, polyesters and other polymeric fibers and the like.

Suitable antistatic agents which may be employed are ionizable metal salts such as described in U.S. Pat. No. 4,617,325 and which is incorporated herein by reference.

The elastomeric polymer of this invention can be prepared by a one-shot method according to the known reaction injection molding techniques, such as described in, for example, *Polyurethanes Handbook* by Günter Oertel, Hanser Publishers (Munich) ISBN 0-02-948920-2 (1985).

The polymer of this invention is preferably a cast elastomer. Such a polymer is advantageously prepared by mixing the reaction components at room temperature or a slightly elevated temperature and then pouring the reaction mixture into a heated mold which is subsequently closed. The reaction mixture, on reacting out, takes the shape of the mold to produce a polyurethane polymer of a predesigned structure, which can then, when sufficiently cured, be removed from the mold.

Suitable conditions for curing, when a cast polymer is formed, include a mold temperature of about 20° C. to 170° C., preferably 35° C. to 75° C., which results in a cure time of about 2 to about 180 minutes, preferably about 2 to about 10 minutes. Optimum cure conditions will depend on the particular components including catalysts and quantities used in preparing the polymer and the size and shape of the article prepared.

The elastomeric polymer of this invention is useful in the preparation of articles such as rollers, hammers, pipe liners, gears, pump chambers, wheels, impellers, door seals, coatings, tires, shoe soles, wiper blades, gaskets, belts and the like. When the polyurethane polymer of this invention is a foam, it is useful in the preparation of upholstery materials, mattresses, packing materials and insulation for sound or heat.

ILLUSTRATIVE EMBODIMENTS

The following examples are provided to illustrate the invention but are not intended to limit the scope thereof. All parts and percentages are given by weight unless otherwise indicated.

The physical properties of the polyoxyalkylene polyols and elastomers where reported are observed according to the following procedures.

Polyol analysis: hydroxyl number and equivalent weight—ASTM D-4274: viscosity—ASTM D-445: unsaturation—ASTM D-4671.

Elastomer analysis: abrasion resistance—DIN 53516: tensile strength and elongation—DIN 53504: flexural fatigue—DIN 53522 and hardness—DIN 53505.

EXAMPLE 1

This example illustrates the preparation of a 2000 equivalent weight polyoxyalkylene polyol containing two internal polyoxyethylene blocks each having a theoretical molecular weight of 396 and containing in total 39.6 weight percent polymerized ethylene oxide, of the total 20 weight percent is present as a terminal polyoxyethylene block.

In a suitable reactor capable of operating at pressure from about 0.01 atm to about 10 atm, an initiator mixture comprising 800 parts of a poly(oxypropylene) diol having an equivalent weight of 200 and 56 parts of potassium hydroxide is prepared. The potassium hydroxide is added as an aqueous solution (45 percent wt/wt).

The resulting mixture is stirred at approximately 60° C. for about one hour, the temperature is then increased to about 100° C. and a vacuum applied to remove the water. When the water content of the initiator mixture as observed by Karl Fischer titrometric analysis is less than about 1500 ppm, the temperature is increased again to about 115° C.

To the initiator mixture at 115° C. is added whilst stirring 1584 parts ethylene oxide at an addition rate of about 800 parts/hour so as to maintain a constant pressure within the reactor of about 3.5 to about 5.0 atmospheres.

When the ethylene oxide feed is complete, the resulting reaction product is stirred at about 115° C. until the pressure within the reactor is constant with time, typically about one to 2 hours. The contents of the reactor are then cooled to about 95° C. and 4032 parts of propylene oxide added at an addition rate of about 1000 parts/hour. When the propylene oxide addition is complete, the reactor temperature is increased to about 100° C., and maintained whilst stirring for approximately 5 hours until a constant internal reactor pressure with time is observed.

The contents of the reactor are then heated to about 115° C. and a further 1584 parts of ethylene oxide added at an addition rate of about 800 parts/hour. When the feed is complete, the reactor contents are stirred at about 115° C. for a further one to 2 hours or until a constant pressure with time is observed.

The potassium content of the crude polyol is removed by treating with magnesium silicate, to give a finished product.

The finished product is characterized in that it has a hydroxyl number of 28, a viscosity of 529 cst (25° C.), 0.047 meq/g unsaturation and a primary hydroxyl content of about 90 percent as determined by nuclear magnetic resonance.

EXAMPLE 2

A polyoxyalkylene polyol having an equivalent weight of 2000 and containing two internal polyoxyethylene blocks each having a molecular weight of 308 and containing in total 34.8 weight percent polymerized ethylene oxide, of the total 19.5 weight percent is present as a terminal polyoxyethylene block.

In a suitable reactor capable of operating at pressure from about 0.01 atm to about 10 atm, an initiator mixture comprising 800 parts of a poly(oxypropylene) diol having an equivalent weight of 200 and 56 parts of potassium hydroxide is prepared. The potassium hydroxide is added as an aqueous solution (45 percent wt/wt).

The resulting mixture is stirred at approximately 60° C. for about one hour, the temperature is then increased to about 100° C. and a vacuum applied to remove the water. When the water content of the initiator mixture is less than about 1500 ppm, the temperature is increased again to about 115° C.

To the initiator mixture at 115° C. is added whilst stirring 1232 parts ethylene oxide at an addition rate of about 800 parts/hour so as to maintain a constant pressure within the reactor of about 3.5 to about 5.0 atmospheres.

When the ethylene oxide feed is complete, the resulting reaction product is stirred at about 115° C. until the pressure within the reactor is constant with time, typically about one to 2 hours. The contents of the reactor are then cooled to about 95° C. and 4480 parts of propylene oxide added at an addition rate of about 1000 parts/hour. When the propylene oxide addition is complete, the reactor temperature is increased to about 100° C., and maintained whilst stirring for approximately 5 hours until a constant internal reactor pressure with time is observed.

The contents of the reactor are then heated to about 115° C. and a further 1584 parts of ethylene oxide added at an addition rate of about 800 parts/hour. When the feed is complete, the reactor contents are stirred at about 115° C. for a further one to 2 hours or until a constant pressure with time is observed.

The potassium content of the crude polyol is removed by treating with magnesium silicate, to give a finished product.

The finished product is characterized in that it has a hydroxyl number of 28.4, a viscosity of 489 cst (25° C.), an unsaturation content of 0.061 meq/g and a primary hydroxyl content of greater than 90 percent as observed by nuclear magnetic resonance.

EXAMPLE 3

A polyoxyalkylene polyol having an equivalent weight of 2000 and containing two internal polyoxyethylene blocks each having a molecular weight of 220 and containing in total 30 weight percent polymerized ethylene oxide, of the total 19.3 weight percent is present as a terminal polyoxyethylene block.

In a suitable reactor capable of operating at pressure from about 0.01 atm to about 10 atm, an initiator mixture comprising 800 parts of a poly(oxypropylene) diol having an equivalent weight of 200 and 56 parts of potassium hydroxide is prepared. The potassium hydroxide is added as an aqueous solution (45 percent wt/wt).

The resulting mixture is stirred at approximately 60° C. for about one hour, the temperature is then increased to about 100° C. and a vacuum applied to remove the water. When the water content of the initiator mixture is less than about 1500 ppm, the temperature is increased again to about 115° C.

To the initiator mixture at 115° C. is added whilst stirring 880 parts ethylene oxide at an addition rate of about 800 parts/hour so as to maintain a constant pressure within the reactor of about 3.5 to about 5.0 atmospheres.

When the ethylene oxide feed is complete, the resulting reaction product is stirred at about 115° C. until the pressure within the reactor is constant with time, typically about one to 2 hours. The contents of the reactor are then cooled to about 95° C. and 4928 parts of propylene oxide added at an addition rate of about 1000 parts/hour. When the propylene oxide addition is complete, the reactor temperature is increased to about 100° C., and maintained whilst stirring for approximately 5 hours until a constant internal reactor pressure with time is observed.

The contents of the reactor are then heated to about 115° C. and a further 1584 parts of ethylene oxide added at an addition rate of about 800 parts/hour. When the feed is complete, the reactor contents are stirred at about 115° C. for a further one to 2 hours or until a constant pressure with time is observed.

The potassium content of the crude polyol is removed by treating with magnesium silicate, to give a finished product.

The finished product is characterized in that it has a hydroxyl number of 27.7, a viscosity of 463 cst (25° C.), an unsaturation content of 0.054 meq/g and a primary hydroxyl content of greater than 90 percent as observed by nuclear magnetic resonance.

EXAMPLE 4

A polyoxyalkylene polyol having a hydroxyl equivalent weight of 2500 and containing two internal polyoxyethylene blocks each having a molecular weight of 396 and containing in total 30.9 weight percent polymerized ethylene oxide, of the total 17.25 weight percent is present as a terminal polyoxyethylene block.

In a suitable reactor capable of operating at pressure from about 0.01 atm to about 10 atm, an initiator mixture comprising 800 parts of a poly(oxypropylene) diol having an equivalent weight of 200 and 56 parts of potassium hydroxide is prepared. The potassium hydroxide is added as an aqueous solution (45 percent wt/wt).

The resulting mixture is stirred at approximately 60° C. for about one hour, the temperature is then increased to about 100° C. and a vacuum applied to remove the water. When the water content of the initiator mixture is less than about 1500 ppm, the temperature is increased again to about 115° C.

To the initiator mixture at 115° C. is added whilst stirring 1584 parts ethylene oxide at an addition rate of about 800 parts/hour so as to maintain a constant pressure within the reactor of about 3.5 to about 5.0 atmospheres.

When the ethylene oxide feed is complete, the resulting reaction product is stirred at about 115° C. until the pressure within the reactor is constant with time, typically about one to 2 hours. The contents of the reactor are then cooled to about 95° C. and 7216 parts of propylene oxide added at an addition rate of about 1000 parts/hour. When the propylene oxide addition is complete, the reactor temperature is increased to about 100° C., and maintained whilst stirring for approximately 5 hours until a constant internal reactor pressure with time is observed.

The contents of the reactor are then heated to about 115° C. and a further 2000 parts of ethylene oxide added at an addition rate of about 800 parts/hour. When the feed is complete, the reactor contents are stirred at about 115° C. for a further one to 2 hours or until a constant pressure with time is observed.

The potassium content of the crude polyol is removed by treating with magnesium silicate, to give a finished product.

The finished product is characterized in that it has a hydroxyl number of 22.2, a viscosity of 723 cst (25° C.), an unsaturation content of 0.087 meq/g and a primary hydroxyl content of greater than 90 percent as observed by nuclear magnetic resonance.

The polyoxyalkylene polyols of Examples 1-4 are used to prepare polyurethane elastomers. The elastomers are prepared with materials as given in Table I. Physical properties of the resulting polyurethane elastomers are given in Table II. Comparative elastomers A, B and C are prepared from comparative polyols A, B and C, respectively. Comparative polyol A is a 2000 equivalent weight linear polyol containing 20 percent by total weight ethylene oxide as an end cap, and unsaturation of 0.060 meq/g. Comparative polyol B is a 2750 equivalent weight linear polyol containing 20 percent by total weight ethylene oxide as an end cap, and unsaturation of 0.062 meq/g. Comparative polyol C is a 2000 equivalent weight linear polyol containing 30 percent by total weight ethylene oxide distributed as a 20 percent end cap and internally as one ethylene oxide block having a molecular weight of 396, and unsaturation of 0.070 meq/g.

TABLE I

| Formulation for Preparation of Elastomeric Polyurethane Polymers | |
|---|---|
| | Parts by Weight |
| polyol-1① | 88.0 |
| polyol-2② | 10.6 |
| chain-extending agent③ | 10.8 |
| catalysts④ | 0.5 |
| surfactants⑤ | 0.5 |
| refrigerant-11 | 7.0 |
| isocyanate⑥ index⑦ | 1.0 |
| | (NCO/OH ratio) |

①Polyol-1, the polyoxyalkylene polyol of Examples 1 to 4.
②Polyol-2, Voranol ™ CP 6001, a trifunctional 6000 molecular weight polyether polyol sold by The Dow Chemical Company.
③1,4-Butanediol.
④Triethylenediamine and dibutyltin dilaurate in a weight ratio of 28:1.
⑤A silicone surfactant, Tegostab ™ B-4113 sold by The Goldschmidt Ag.
⑥Voranate ™ M342, an isocyanate-terminated pre-polymer sold by The Dow Chemical Company, having a 23 weight percent NCO content prepared from 4,4'-diphenylmethane diisocyanate.
⑦Total water content of formulation as observed by Karl Fischer titration, about 0.15 weight percent.

TABLE II

| | Polyurethane Elastomers (density approximately 600 kg/m3) | | | | | | | |
|---|---|---|---|---|---|---|---|---|
| | Elastomer | | | | | Comparative Elastomer | | |
| Polyoxyalkylene polyol | 1 | 1-aged[1] | 2 | 3 | 4 | A | B | C |
| Polymer Physical Properties | | | | | | | | |
| Hardness (Shore A) | 58 | 58 | 63 | 66 | 63 | 70 | 73 | 68 |
| Tensile Strength (MPa) | 4.8 | 4.6 | 4.8 | 4.7 | 3.0 | 4.6 | 4.7 | 4.8 |
| Elongation (%) | 400 | 370 | 385 | 370 | 300 | 350 | 320 | 400 |
| Flexural Fatigue (20° C.) (cut growth in mm) after 1 × 10⁵ cycles | 0.2 | 0.2 | 0.4 | 0.3 | 1.5 | 0.2 | 0.3 | 0.2 |
| Abrasion Loss (mg) | 190 | 200 | 180 | 230 | 310 | 300 | 250 | 290 |

[1] Physical properties after humid aging of polymer for 7 days at 70° C./95 percent relative humidity followed by 1 day at 70° C. in a dry oven.

As can be seen from the data of Table II, the polymers of this invention prepared with polyoxyalkylene polyols containing internal polyoxyethylene blocks of defined molecular weight display significantly reduced abrasion loss and therefore increased abrasion resistance while maintaining tensile strength, elongation and flexural fatigue properties.

The polymer prepared from polyoxyalkylene polyol 4 exhibits slightly inferior properties but these are most probably due to the polyol's greater equivalent weight and significantly higher unsaturation content.

The improved abrasion resistance of the polymers of this invention is attained through the high ethylene oxide content for their given equivalent weight made possible due to the specific manner of distributing the ethylene oxide within the polyol. The abrasion resistance is acquired without apparent detriment to desirable humid aging characteristics of the polymer.

What is claimed is:

1. An elastomeric polyisocyanate-based polymer prepared by contacting under reaction conditions a mixture comprising
   (a) an organic polyisocyanate; and
   (b) an isocyanate-reactive composition comprising at least one polyoxyalkylene polyol having a hydroxyl equivalent weight of from about 800 to about 3000 and containing polymerized ethylene oxide in from about 20 to about 40 weight percent by total weight of the polyoxyalkylene polyol wherein
      (i) the polyol contains at least two internal polyoxyethylene blocks having a molecular weight of from about 220 to about 528, and
      (ii) the polyol is capped with polymerized ethylene oxide in from about 15 to about 25 weight percent by total weight of the polyol, and
characterized in that the ratio of (a) to (b) is such so as to provide an average of from 0.9 to 1.25 isocyanate groups per active hydrogen atom present in the isocyanate-reactive composition.

2. The polymer as claimed in claim 1 wherein the internal polyoxyethylene block has a molecular weight of from about 308 to about 440.

3. The polymer as claimed in claim 1 wherein the polyol is prepared from an initiator containing an average of at least 1.7 active hydrogen atoms per molecule.

4. The polymer as claimed in claim 3 wherein the initiator contains an average of from about 1.8 to about 3 active hydrogen atoms per molecule.

5. The polymer as claimed in claim 4 wherein the polyol has an average hydroxyl equivalent weight of from about 1000 to about 2500.

6. The polymer as claimed in claim 1 wherein the polyisocyanate comprises an aromatic polyisocyanate.

7. The polymer as claimed in claim 6 wherein the aromatic polyisocyanate comprises at least 50 weight percent 4,4'-diphenylmethane diisocyanate or derivatives thereof.

8. The polymer as claimed in claim 7 prepared by reacting the polyisocyanate with an isocyanate-reactive composition containing at least one polyoxyalkylene polyol having a hydroxyl equivalent weight of from about 1500 to about 2300 and containing polymerized ethylene oxide in from about 20 to about 40 weight percent by total weight of the polyol wherein the polymerized ethylene oxide is present as
   (i) at least two internal polyoxyethylene blocks having a molecular weight of from about 220 to about 528; and
   (ii) a polymerized ethylene oxide cap that represents from about 15 to about 25 weight percent by total weight of the polyol, and
wherein the ratio of (a) to (b) is such so as to provide from about 0.97 to about 1.05 isocyanate groups per active hydrogen atom present in the isocyanate-reactive composition.

9. A polyoxyalkylene polyol having a hydroxyl equivalent weight of from about 800 to about 3000 and containing polymerized ethylene oxide in from about 20 to about 40 weight percent by total weight of the polyoxyalkylene polyol and characterized in that
   (i) the polyol contains at least two internal polyoxyethylene blocks having a molecular weight of from about 220 to about 528, and
   (ii) in that the polyol is capped with polymerized ethylene oxide in from about 15 to about 25 weight percent by total weight of the polyol.

10. An isocyanate-reactive composition suitable for use in preparing an elastomeric polyisocyanate-based polymer characterized in that it comprises
   (a) at least one polyoxyalkylene polyol having a hydroxyl equivalent weight of from about 800 to about 3000 and containing polymerized ethylene oxide in from about 20 to about 40 weight percent by total weight of the polyoxyalkylene polyol wherein
      (i) the polyol contains at least two internal polyoxyethylene blocks having a molecular weight of from about 220 to about 528, and wherein
      (ii) the polyol is capped with polymerized ethylene oxide in from about 15 to about 25 weight percent by total weight of the polyol; and (b) from about 2 to about 40 parts by weight per 100 parts by total weight of all polyol present of a difunctional chain-extending agent.

11. In a process for preparing an elastomeric polyisocyanate-based polymer having an average density of from about 200 to about 700 kg/m3, the improvement comprising employing a polymer-forming composition comprising (A) a polyoxyalkylene polyol having a hydroxyl equivalent weight of rom about 800 to about 3000 and containing polymerized ehtylene oxide in from about 20 to about 40 weight percent by total weight of the polyol wherein (i) the polyol contains at least two internal polyoxyethylene blocks having a molecular weight of from about 220 to about 528, and (ii) the polyol is capped with polymerized ethylene oxide in from about 15 to about 25 weight percent by total weight of the polyol.

(B) a chain-extending agent having a molecular weight of about 250 or less, (C) an isocyanate-terminated 4,4'-methylene diphenylisocyanate prepolymer, in an amount to provide the composition with from about 0.9 to about 1.25 isocyanate groups per active hydrogen-containing group, and (D) an effective amount of a blowing agent wherein (B) is present in from about 2 to about 40 parts by weight per 100 parts of total weight of all polyol including (A).

* * * * *